(12) United States Patent
Han et al.

(10) Patent No.: US 9,196,935 B2
(45) Date of Patent: Nov. 24, 2015

(54) MICRO-CHANNEL COOLING FIN DESIGN BASED ON AN EQUIVALENT TEMPERATURE GRADIENT

(71) Applicant: GM Global Technology Operations LLC, Detroit, MI (US)

(72) Inventors: Taeyoung Han, Bloomfield Hills, MI (US); Kuo-Huey Chen, Troy, MI (US); Bahram Khalighi, Troy, MI (US); Rachit Garg, Bangalore (IN); Philip Klaus, Heidesheim (DE)

(73) Assignee: GM Global Technology Operations, LLC, Detroit, MI (US)

( * ) Notice: Subject to any disclaimer, the term of this patent is extended or adjusted under 35 U.S.C. 154(b) by 38 days.

(21) Appl. No.: 13/796,649

(22) Filed: Mar. 12, 2013

(65) Prior Publication Data

US 2014/0272496 A1   Sep. 18, 2014

(51) Int. Cl.
*H01M 2/12* (2006.01)
*H01M 10/613* (2014.01)
*H01M 10/625* (2014.01)

(52) U.S. Cl.
CPC ...... *H01M 10/5004* (2013.01); *H01M 10/5016* (2013.01); *H01M 10/613* (2015.04); *H01M 10/625* (2015.04)

(58) Field of Classification Search
None
See application file for complete search history.

(56) References Cited

U.S. PATENT DOCUMENTS

| | | | |
|---|---|---|---|
| 2004/0182548 A1* | 9/2004 | Lovette et al. | 165/103 |
| 2005/0068724 A1* | 3/2005 | Pokharna et al. | 361/687 |
| 2005/0205241 A1* | 9/2005 | Goodson et al. | 165/80.4 |
| 2007/0006996 A1* | 1/2007 | Mikubo et al. | 165/104.33 |
| 2010/0304192 A1* | 12/2010 | Chan et al. | 429/50 |
| 2011/0200862 A1* | 8/2011 | Kurosawa | 429/120 |
| 2012/0040225 A1* | 2/2012 | Raiser | 429/120 |
| 2013/0183555 A1* | 7/2013 | Boddakayala | 429/72 |

* cited by examiner

*Primary Examiner* — Patrick Ryan
*Assistant Examiner* — Jose Colucci Rios
(74) *Attorney, Agent, or Firm* — Brooks Kushman P.C.

(57) ABSTRACT

A micro-channel cooling fin for a battery module and battery is provided. The cooling fin includes a metal plate assembly that defines a plurality of cooling channels therein. The metal plate assembly includes an inlet section for introducing a coolant into the plurality of cooling channels and an outlet section from which the coolant exits the plurality of cooling channels. Each channel has an output temperature and an input temperature such that the output temperature minus the input temperature for each cooling channel is within a predetermined amount.

15 Claims, 11 Drawing Sheets

MICRO-CHANNEL COOLING FIN DESIGN BASED ON AN EQUIVALENT TEMPERATURE GRADIENT

TECHNICAL FIELD

In at least one aspect, the present invention is related to cooling systems for battery modules, and in particular, to cooling fins used in such cooling systems.

BACKGROUND

Large capacity rechargeable batteries are currently being investigated for use in electric vehicles. The ultimate feasibility of electric vehicles depends on significantly reducing the associated costs. Reduction in the costs of battery assemblies is particularly important in this regard.

Lithium ion batteries are an important type of battery technology. Most battery assemblies, including lithium ion battery assemblies, include a plurality of individual electrochemical cells. Typically, such electrochemical cells include an anode, a cathode, and a separator positioned between the anode and cathode. Typically, the anode includes a metal sheet or foil (usually copper metal) over-coated with a graphitic layer. Similarly, the cathode usually includes a metal sheet or foil (usually aluminum metal) over-coated with a lithium-containing layer. Finally, electrochemical cells include an electrolyte which is interposed between the anode and the cathode. Terminals allow the generated electricity to be used in an external circuit. Electrochemical cells produce electricity via an electrochemical reaction.

For high power application, a plurality of battery cells are utilized and assembled into a battery module. Moreover, such battery modules can include a plurality of metallic (e.g., copper and/or aluminum) cooling fins interspersed between battery cells in a parallel wired battery cell pair. Compression foam pads are typically interspersed between some battery pairs. It turns out that such battery modules typically exhibit temperature differences between the battery cells. Such temperature differences lead to a reduction in battery module performance with a decrease in battery lifetime. Although the prior art cooling fins work reasonably well in cooling the battery cells, improvements are still desirable.

Accordingly, there is a need for improved battery module assemblies and cooling fins to be used therein.

SUMMARY

The present invention solves one or more problems of the prior art by providing in at least one embodiment a micro-channel cooling fin for a battery module. The cooling fin includes a metal plate assembly that defines a plurality of cooling channels therein. The metal plate assembly includes an inlet section for introducing a liquid coolant into the plurality of cooling channels and an outlet section from which the coolant exits the plurality of cooling channels. A first subset of the cooling channels provides a first mass flow rate of the coolant to a first fin region of the metal plate assembly and a second subset of the cooling channels provides a second mass flow rate of the coolant to a second fin region of the metal plate assembly. Characteristically, the first mass flow rate is higher than the second mass flow rate. The metal plate assembly is positionable adjacent to a battery cell such that the first fin region is proximate to a first battery region and the second fin region is proximate to a second battery region where the first battery region has higher temperature during battery operation than the second battery region when the battery is not cooled. Advantageously, the cooling fin compensates for the non-uniform heat generation from the battery cells thereby resulting in a more uniform temperature profile along the battery cells during operation.

In another embodiment, a micro-channel cooling fin for a battery module is provided. The cooling fin includes a metal plate assembly that defines a plurality of cooling channels therein. The metal plate assembly includes an inlet section for introducing a liquid coolant into the plurality of cooling channels and an outlet section from which the coolant exits the plurality of cooling channels. Each channel has an output temperature and an input temperature such that the output temperature minus the input temperature is substantially the same for each channel.

In another embodiment, a battery module incorporating the cooling fin set forth above is provided. The battery module includes a plurality of battery cells with a plurality of cooling fins interposed between battery cells in the plurality of battery cells. A liquid coolant system circulates liquid coolant through the cooling fins. Each cooling fin includes a metal plate assembly defining a plurality of cooling channels therein. The metal plate assembly includes an inlet section for introducing a coolant into the plurality of cooling channels and an outlet section from which the coolant exits the plurality of cooling channels. A first subset of the cooling channels provides a first mass flow rate of the coolant to a first fin region of the metal plate assembly and a second subset of the cooling channels provides a second mass flow rate of the coolant to a second fin region of the metal plate assembly. Characteristically, the first mass flow rate is higher than the second mass flow rate. The metal plate assembly is positionable adjacent to a battery cell such that the first fin region is proximate to a first battery region and the second fin region is proximate to a second battery region where the first battery region has higher temperature during battery operation than the second battery region when the battery is not cooled.

DETAILED DESCRIPTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: the description of a group or class of materials as suitable or preferred for a given purpose in connection with the invention implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
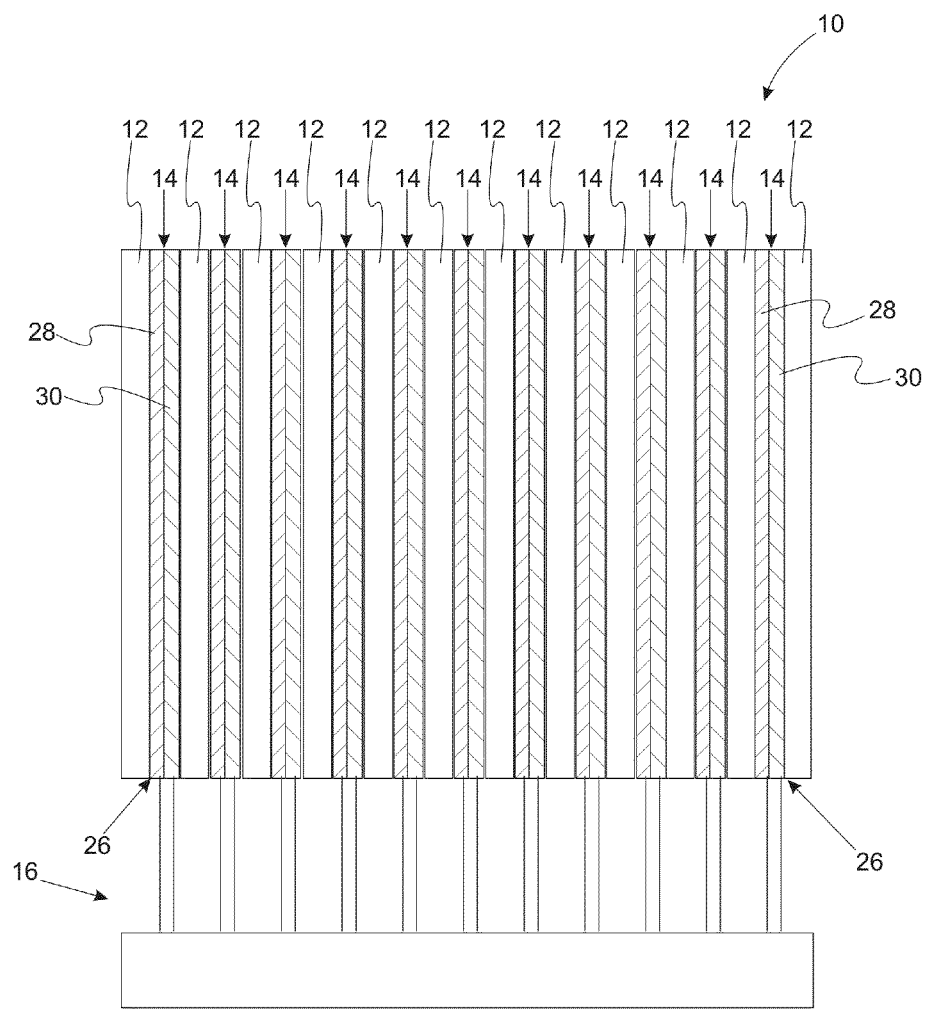
FIG. 1 is a schematic of a battery module incorporating micro-channel cooling fins to cooling the battery cells.
Figure 2:
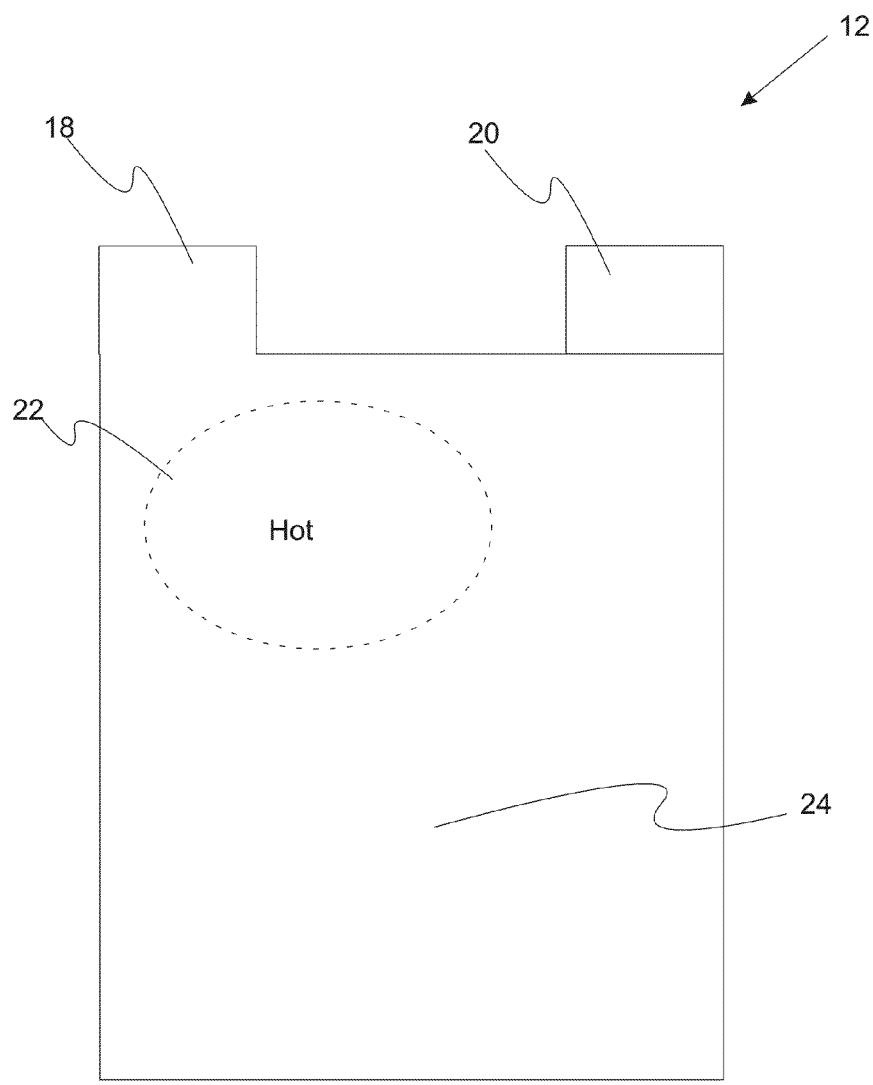
FIG. 2 is a schematic illustration of a battery cell.

With reference to FIG. 1, a micro-channel cooling fin integrated in a battery module is provided. Battery module 10 includes a plurality of battery cells 12 with a plurality of cooling fins 14 interposed between battery cells 12. Liquid coolant system 16 circulates liquid coolant through the cooling fins 14. An example of a suitable liquid coolant is DEX-COOL® (ethylene glycol). A representative flow rate is 10 l/min of DEX-COOL® for 96 cooling fins 14. Although the present embodiment is not limited to battery modules with any particular number of battery cells, modules with 5 to 100 battery cells are typical. The details of the cooling fins are set forth below. FIG. 2 provides illustration of a battery cell 12 showing the position of hot regions. In particular, the battery cells are each positioned in a pouch, i.e., the anode, cathode and separator are within a protective pouch. Cathode tab 18 and anode tab 20 are used to make electrical contact to the battery cell. Battery cell 12 exhibits a non-uniform temperature profile during operation such that the temperature is higher proximate to cathode tab 18 and anode tab 20. In particular, the temperature is highest in the vicinity of cathode tab 18 as indicated by item number 22. Region 24, which is more distant from cathode tab 18 and anode tab 20, is typically at a lower temperature.

Figure 3:
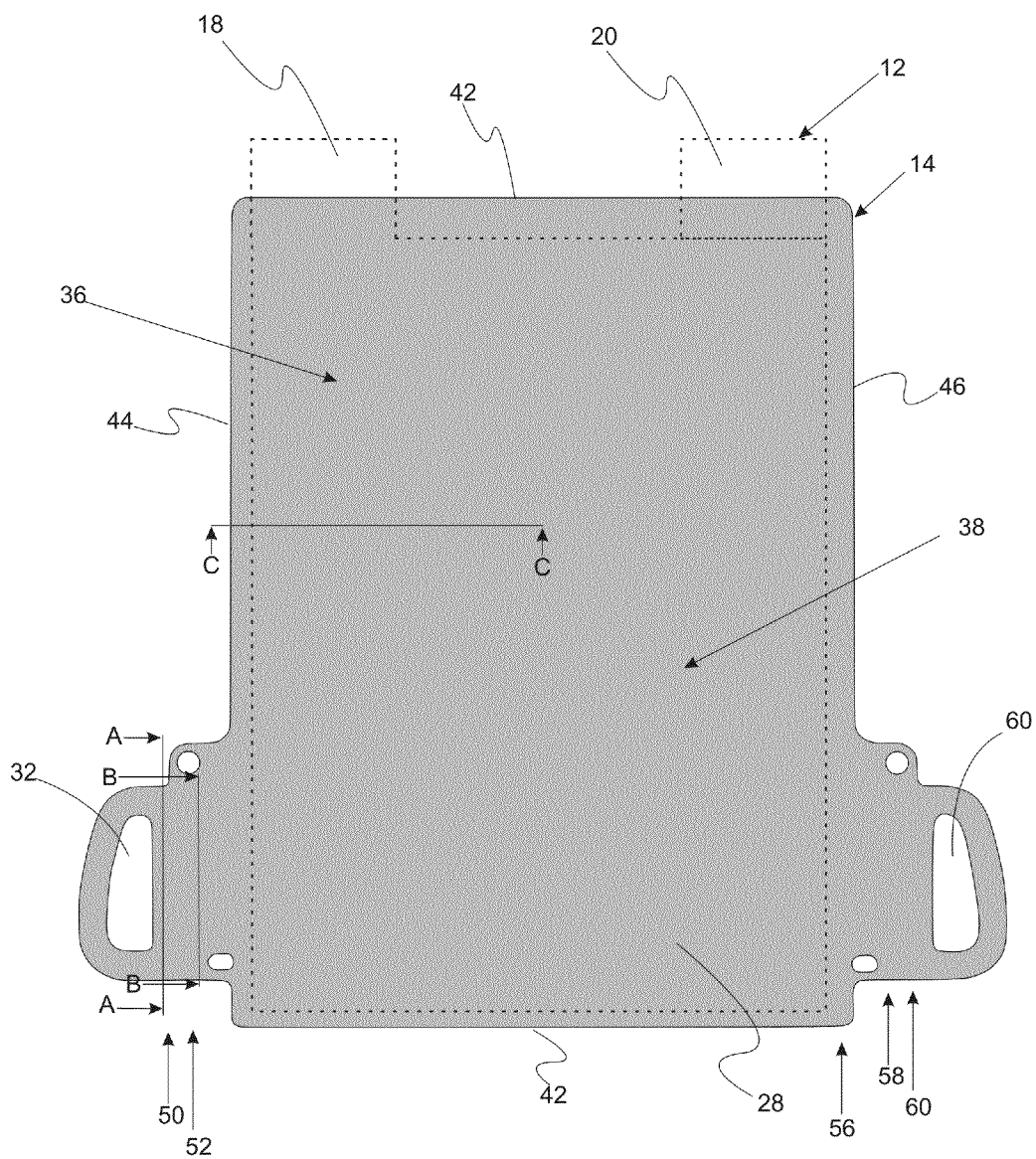
FIG. 3 is a schematic illustration showing the alignment of a cooling fin with a battery cell.
Figure 4A:
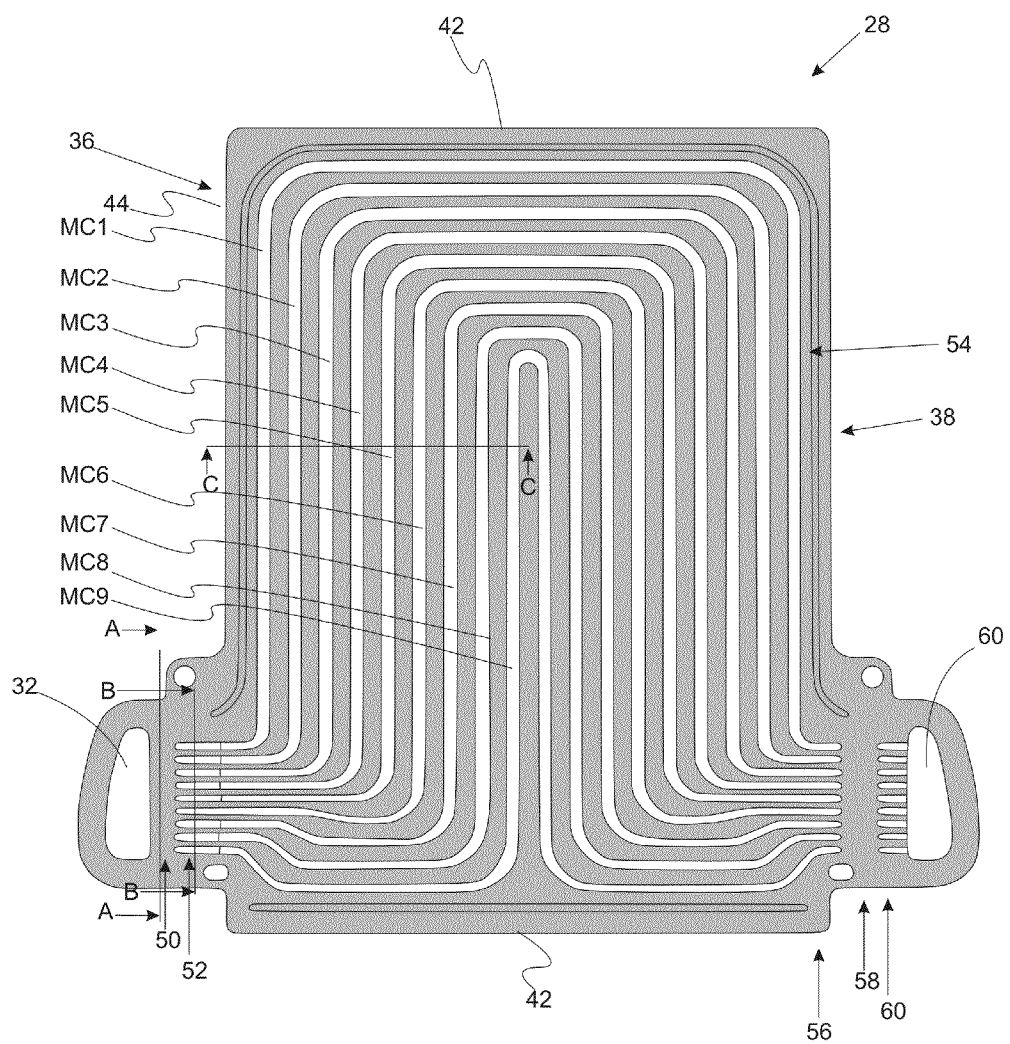
FIGS. 4A and 4B provide schematic front views of metal plates having cooling channel portions defined therein.
Figure 4B:
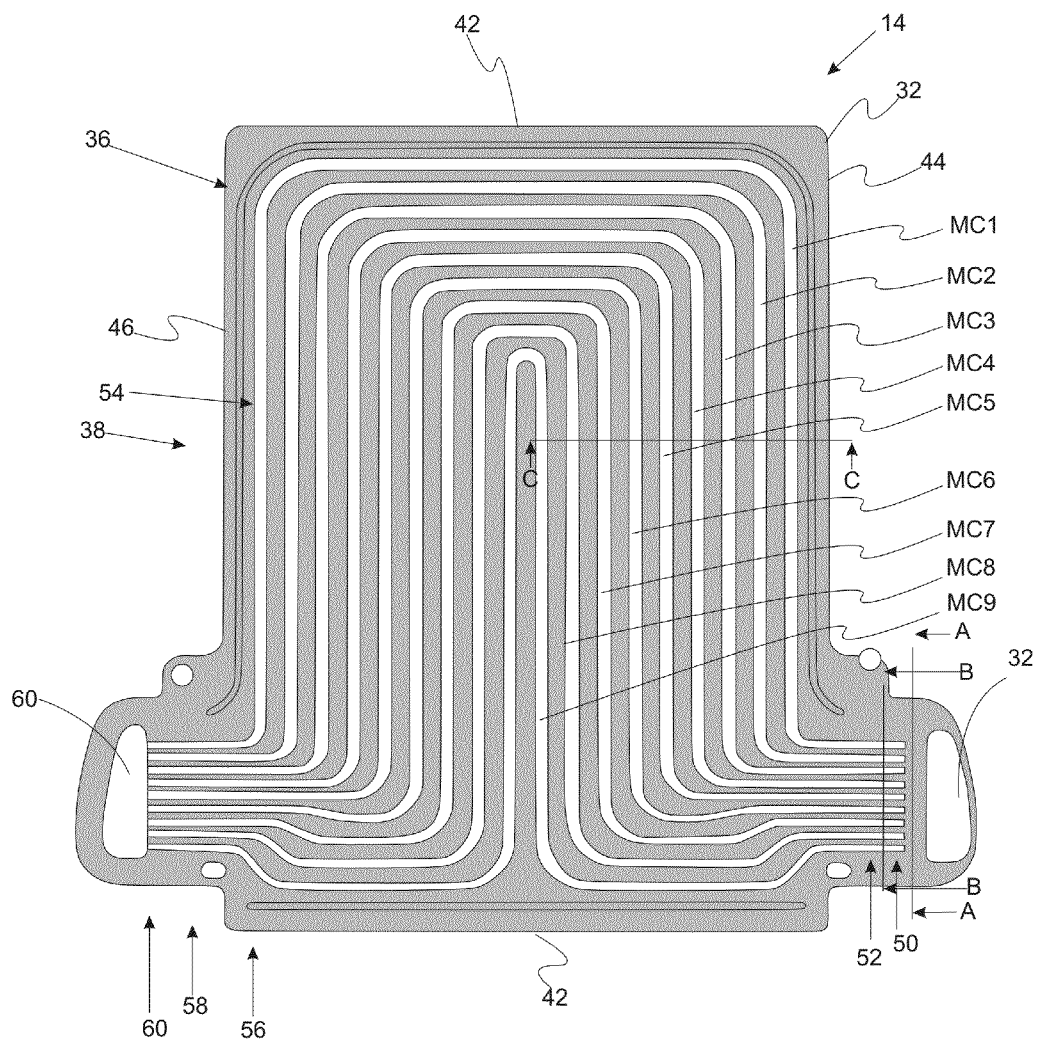

With reference to FIGS. 3, 4A and 4B, schematic illustrations of a cooling fin are provided. FIG. 3 is a schematic illustration showing the alignment of cooling fin 14 with battery cell 12. FIGS. 4A and 4B provide schematic front views of metal plates having cooling channel portions defined therein. Cooling fin 14 includes metal plate assembly 26 which defines a plurality of cooling channels MC1-MC9 therein. In should be appreciated that the present invention is not limited by the number of channels. Virtually an number of channels may be used depending on the size of the area to be cooled. In the order MC1 to MC9, the cooling channels are more distant on average from the anode and cathode tabs (i.e., MC1 is closer to the tabs than MC2 which is closer to the tabs than MC3 which is closer to the tabs than MC4-MC9). In a refinement, metal plate assembly 26 is formed from two mating metal (e.g., copper, aluminum, etc.) sheets 28 and 30. In this refinement, a portion P1 of cooling channels MC1-MC9 is defined by metal sheets 28 and a portion P2 of cooling channels MC1-MC9 are defined by metal sheet 28 such that when sheet 28 and 30 are joined together, cooling channels MC1-MC9 are formed. Typically, these portions of cooling channels MC1-MC9 are stamped into metal sheets 28 and 30. The metal plate assembly includes inlet section 32 for introducing a coolant into the plurality of cooling channels MC1-MC9 and an outlet section 60 from which the coolant exits the plurality of cooling channels MC1-MC9. A first subset of the cooling channels provides a first mass flow of the coolant to first fin region 36 of the metal plate assembly and a second subset of the cooling channels MC1-MC9 provides a second mass flow of the coolant to second fin region 38 of the metal plate assembly 26. Typical flow rates are from about 0.15 to about 0.4 grams/second. For example, the first subset includes cooling channels MC1-MC3 and the second subset includes MC4-MC9. Metal plate assembly 26 is positionable adjacent to battery cell 12 such that first fin region 36 is proximate to first battery region 22 and second fin region 38 is proximate to a second battery region 24 where first battery region 22 has higher temperature during battery operation than second battery region 24 when battery cell 12 is not cooled.

Each channel of the first subset of cooling channels (e.g., MC1-MC3) allows a higher mass flow rate than each channel of the second subset of cooling channels (e.g., MC4-MC9) when the coolant is flowed through the channels. In a refinement, cooling channel MC1 allows a higher mass flow rate than cooling channel MC2 which allows a higher mass flow rate than channel MC3. Typically, each channel of the first subset has a lower flow resistance than each channel of the second subset in order to achieve the specified mass flow rates. In a refinement, cooling channel MC1 has a lower flow resistance than cooling channel MC2 which has a lower flow resistance than cooling channel MC3. In this refinement, cooling channel MC3 has a lower flow resistance than cooling channels MC4-MC9. In this regard, each channel of the first subset (i.e., MC1-3) has a higher cross sectional area than each channel of the second subset (i.e., MC4-9). In a refinement, cooling channel MC1 has a higher average cross sectional area than cooling channel MC2 which has a higher average cross sectional area than cooling channel MC3. In this refinement, cooling channel MC3 has a higher average cross sectional area than channels MC4-MC9. In particular, the proposed cooling channels MC1-MC9 are designed (i.e., flow resistance) such that the output temperature (at outlet region 60) minus the input temperature of the coolant (at inlet region 32) flowing through each channel is approximately constant for each channel of the plurality of channels. i.e., the output temperature minus the input temperature is substantially the same for each channel (within 5° C. for example). In a variation, the channels of the first subset have a smaller average separation than the channels of the second subset. In a refinement, the average separation between channels MC1-MC3 is at least 5 percent lower than the average separation between channels MC4-MC9.

Figure 5C:
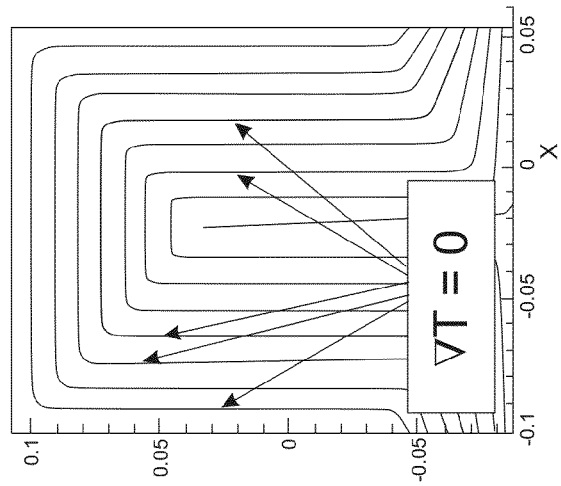
FIG. 5C provides a schematic illustrating the positioning of zero gradient surfaces for the cooling fin of FIG. 5A.
Figure 5B:
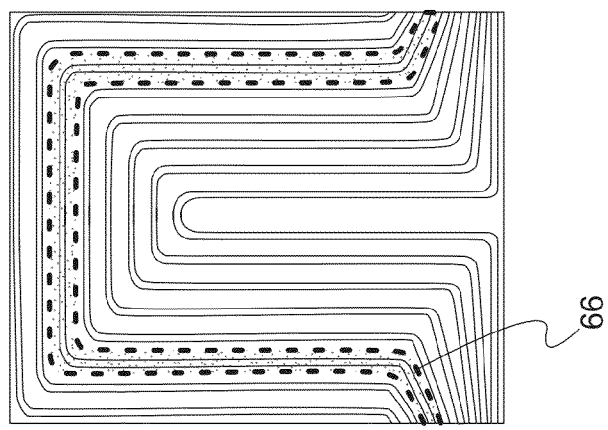
FIG. 5B provides a schematic illustrating the positioning of a heat transfer area for each channel.
Figure 5A:
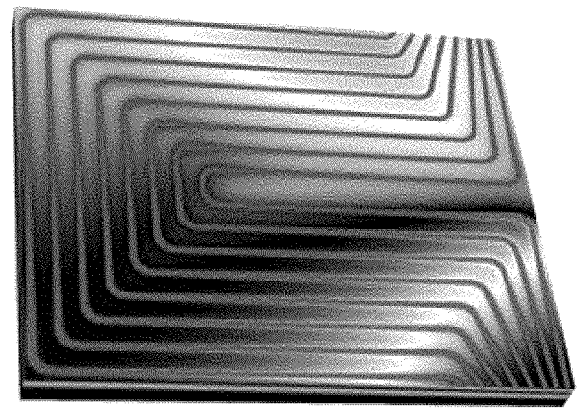
FIG. 5A is a surface temperature profile for a cooling fin having cooling channels that provide more cooling to hot regions of a battery cell.

In general, a more uniform temperature is achieved by flowing more coolant to regions generating more heat. With reference to FIGS. 5A, 5B, and 5C, details for calculating details of cooling channels MC1-9 are provided. FIG. 5A provides a simulated input temperature profile using computational fluid dynamics. Temperature contours and the boundaries are calculated. In particular, surfaces along which there is a zero temperature gradient are determined as indicated in FIG. 5B by the dotted line 66. Heat is not conducted across such zero gradient surfaces. As shown in FIG. 5B, the cooling channels are within these zero gradient surfaces. FIG. 5C provides a schematic diagram of the zero gradient surfaces. Heat flows from between the zero gradient surface toward the respective cooling channel contained therein. From energy conservation, a desired mass flow rate or at least a relative rate for each of channels MC1-9 is determined from equation (1):

$$\{\dot{m}_i C_p (T_{out} - T_{in})\}_i = \dot{q}_i * \delta S_i \quad (1)$$

wherein
$\dot{m}_i$ is the mass flow rate through channel i;
$C_p$ is the specific heat of the coolant;
$T_{in}$ is the inlet temperature of the coolant;
$T_{out}$ is the outlet temperature of the coolant;
$\dot{q}_i$ is the local heat generation in the region being cooled by channel i; and
$\delta S_i$ is the total area of the heat transfer boundary.

In accordance to an embodiment of the cooling channels, $(T_{out} - T_{in})_i = \kappa =$ constant. This feature ensures that the cooling fin and the battery results in a more uniform temperature profile. The requirement of a constant $T_{out} - T_{in}$ allows equation (1) to be rearranged as follows:

$$\dot{m}_i = \frac{\dot{q}_i * \delta S_i}{\kappa * C_p} \quad (2)$$

Once a desired mass flow rate is determined, the mass flow rate can be set by adjusting the cooling channel dimension in accordance to equation (3):

$$\dot{m}_i = \sqrt{\frac{\rho \Delta P_i * h_i}{C_f \ell_i}} \delta A_i = \sqrt{\frac{\rho \Delta P_i * h_i}{C_f}} \frac{\delta A_i}{\sqrt{\ell_i}} = C \frac{\delta A_i}{\sqrt{\ell_i}} \quad (3)$$

wherein
$\rho$ is the density of the coolant;
$C_f$ wall friction coefficient of the pipe flow;
$\Delta P$ is the pressure drop from the inlet to the outlet for the micro channels;
$h_i$ is the height of the channel;
C is a constant if the height is taken to be constant;
$l_i$ is the length of a channel; and
$\delta A_i$ is the cross sectional area of cooling channel i. Equation (3) shows that the mass flow rate may be set by varying the cross sectional area.

With reference to FIGS. 3, 4A and 4B, details of the cooling channels are provided. Metal plate assembly 26 has a first end 40 and a second end 42, a first side 44, and a second side 46. Inlet section 32 is positioned at the first end 40 and the first side 44. Outlet region 60 is positioned at the second end 42 and the second side 46. Coolant is introduced into cooling channels MC1-MC9 at inlet section region 32.

Figure 6A:
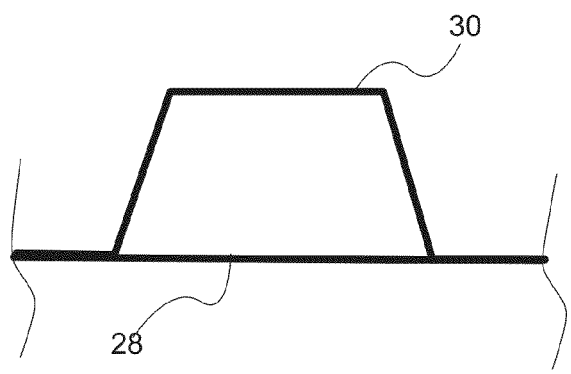
FIG. 6A is a schematic illustration of cooling channels having a trapezoidal cross section at position A when the metal plates of the cooling fin are joined together.
Figure 6B:
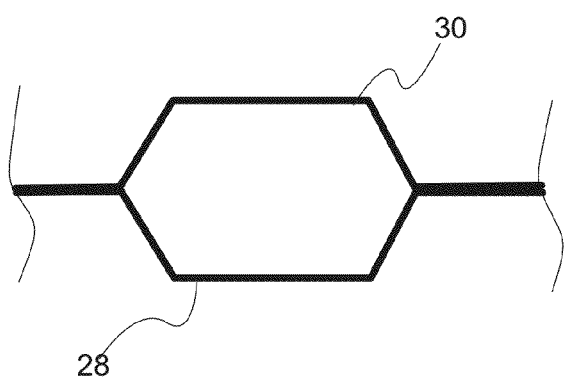
FIG. 6B is a schematic illustration of cooling channels having a hexagonal cross section at position B when the metal plates of the cooling fin are joined together.
Figure 6C:
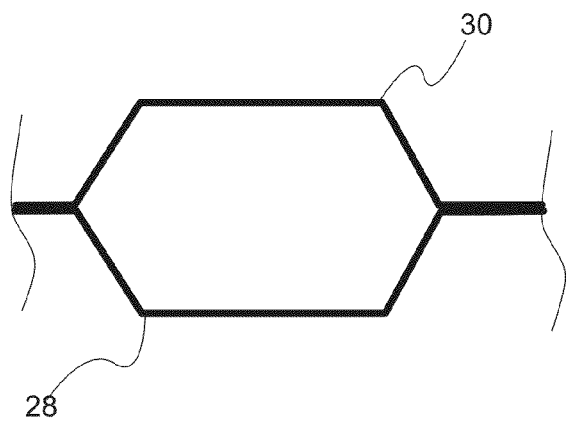
FIG. 6C is a schematic illustration of cooling channels having a hexagonal cross section at position C when the metal plates of the cooling fin are joined together.

In a refinement, each of cooling channels MC1-MC9 includes a first channel region 50 that extends from first side 44 with a first cross sectional area. Although cooling channels MC1-MC9 are not limited by any specific shape of the channel cross sections, FIG. 6A depicts a refinement in which the cross section at position A of first channel region 50 is trapezoidal. In a refinement, the first cross sectional area is from 0.5 to about 0.8 mm$^2$. A second channel region 52 is in fluid communication with first channel region 50 and has a second cross sectional area. FIG. 6B depicts a refinement in which the cross section at position B of second channel region 52 is hexagonal. In a refinement, the second cross sectional area is from 0.5 to about 0.8 mm$^2$. Each cooling channel MC1-MC9 also includes a generally U-shaped section that is in fluid communication with second channel region 52 and extends in a direction from first end 40 towards second end 42. FIG. 6C depicts a refinement in which the U-shaped section 54 has a hexagonal cross section with a third cross sectional area. Typically, U-shaped section 54 is symmetrical. In a refinement, the third cross sectional area is from 1.0 to about 1.8 mm$^2$. Cooling channels MC1-MC9 also include additional channel regions such as channel regions 56, 58, and 60. The cross sections of these regions may be any desired shape (e.g., rectangular, square, trapezoidal, hexagonal).

As set forth above, variations of the present invention are designed such that the mass flow of coolant is higher at positions of the cooling fin that are placed adjacent to positions on the battery cell that tend to produce more heat and have a higher temperature without cooling. This is in contrast to prior art designs which tended to flow the same mass flow through each cooling channel. Table 1 provide examples of cooling channel dimensions:

|  | Prior Art | Current Design Example |
| --- | --- | --- |
| A-A | 0.551 mm$^2$ | 0.59 mm$^2$ |
| B-B | 0.54 mm$^2$ | 0.59 mm$^2$ |
| C-C | 0.54 mm$^2$ | 1.53 mm$^2$ for MC 1 |
|  |  | 1.41 mm$^2$ for MC 2 |
|  |  | 1.26 mm$^2$ for MC 3 |
|  |  | 1.19 mm$^2$ for MC 4 to 9 |

Figure 7A:
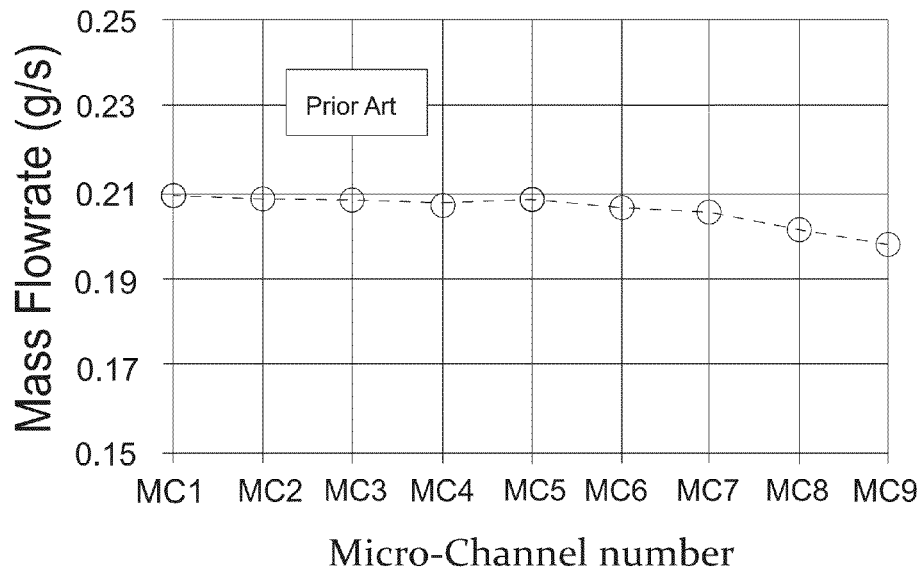
FIG. 7A is a plot of the mass flow through each channel in which the mass flow is approximately constant.
Figure 7B:
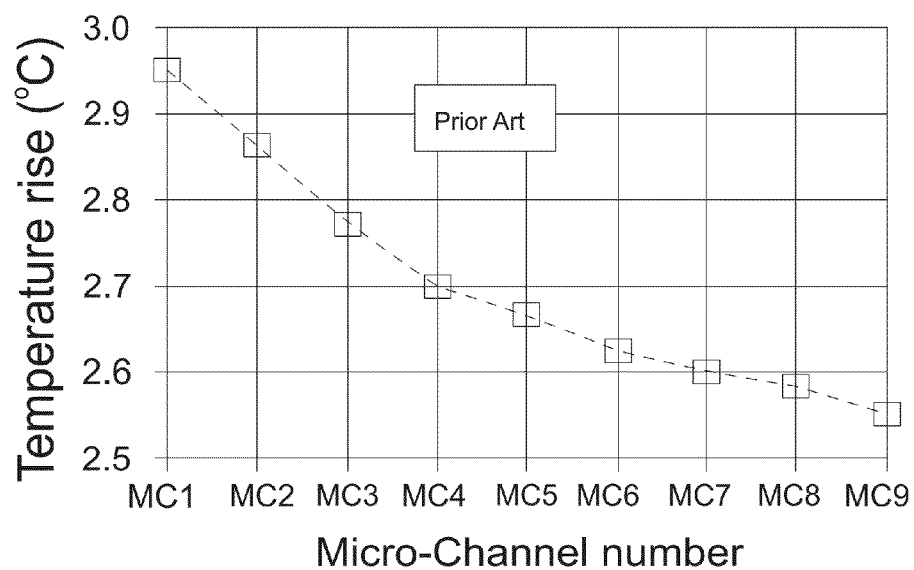
FIG. 7B is a plot of the resulting temperature rise in each channel.
Figure 8A:
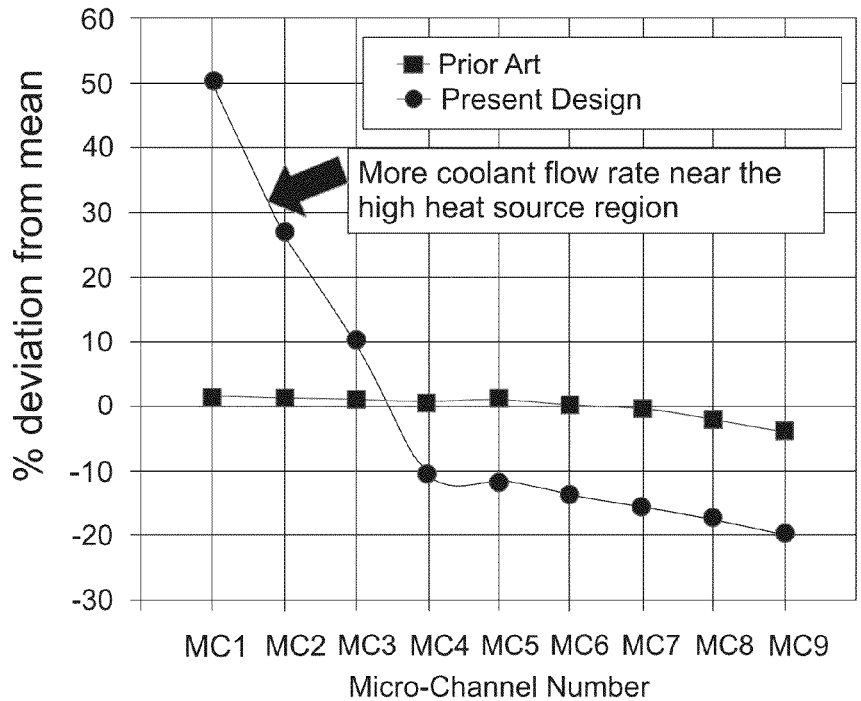
FIG. 8A provides plots of the percent deviation of the mass flow rate for the present design and for the prior art.

FIGS. 7A and 7B illustrate the prior art designs. FIG. 7A gives a plot of the mass flow through each channel in which the mass flow is approximately constant. FIG. 7B provides a plot of the resulting temperature rise in each channel. It is evident that coolant flowing through channels near the cathode and anode tabs tends to get hotter than fluid flowing further from the tabs. FIG. 8A provides a plot of the percent deviation of the mass flow rate for the present design and for the prior art. As depicted in FIG. 8A, the coolant flow through channels MC1-MC3 are increased relative to channels MC4-

Figure 8B:
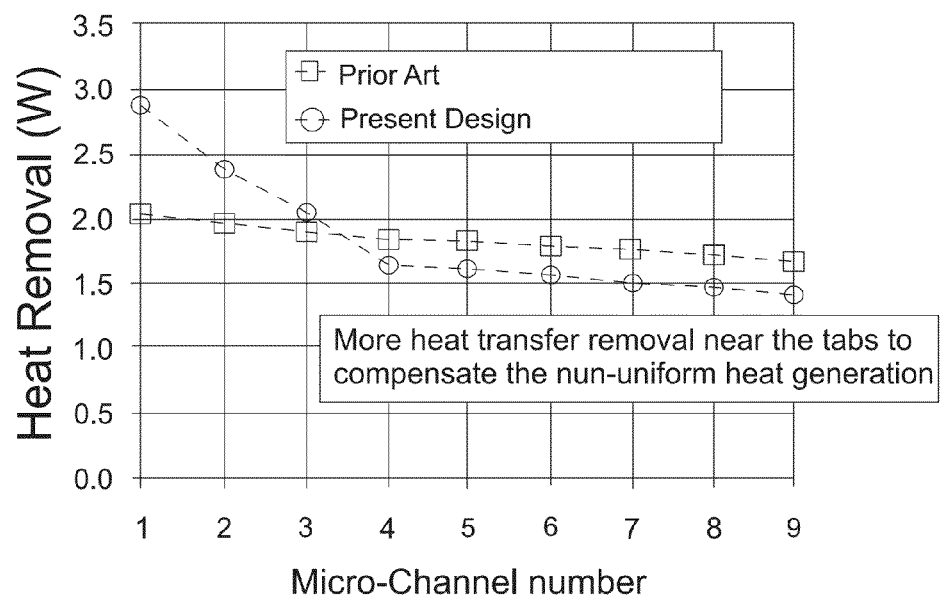
FIG. 8B provides plots of the heat removal for the present design and for the prior art.
Figure 9:
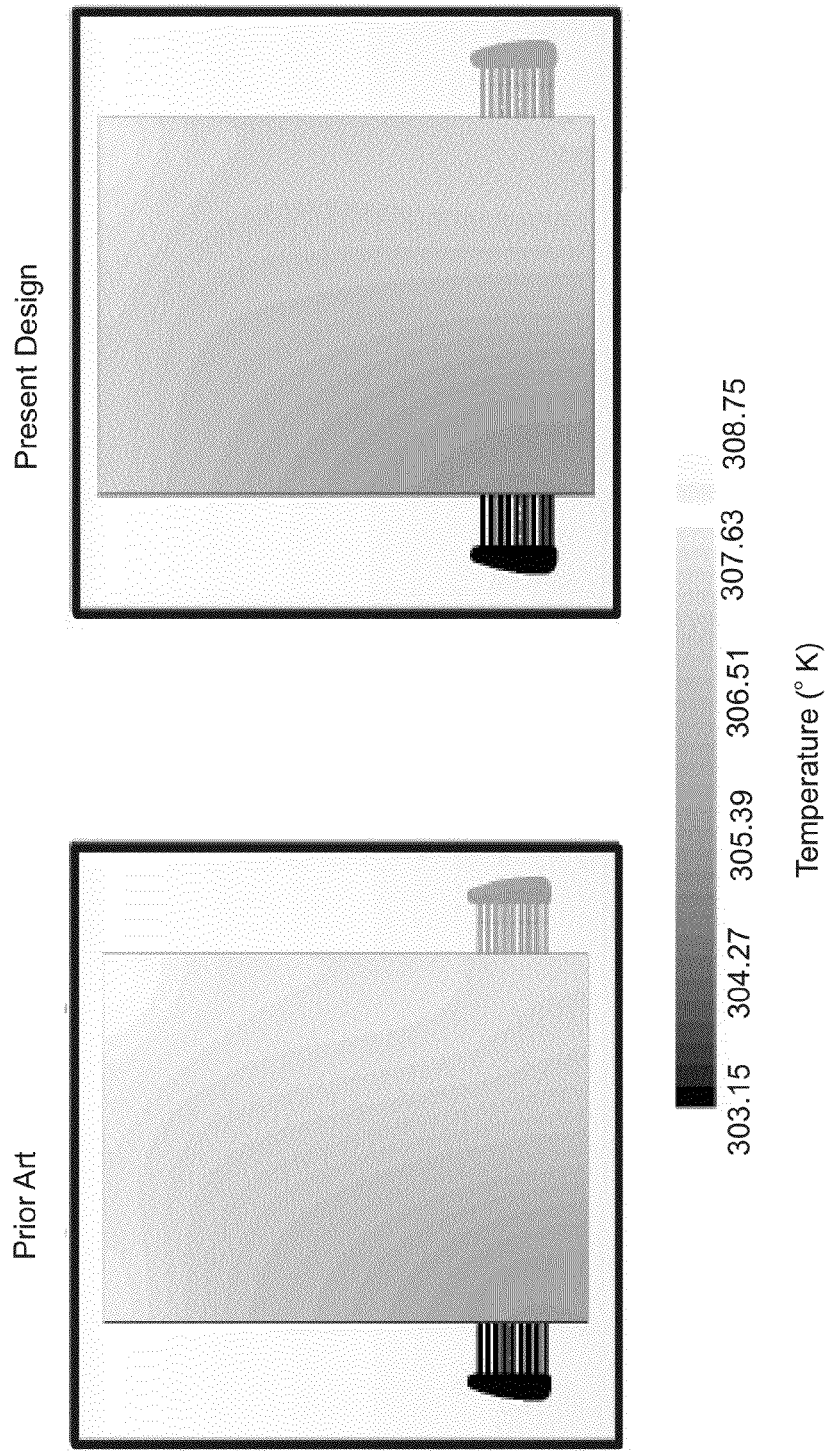
FIG. 9 provides a calculated temperature profile for a prior art cooling fin and for a cooling fin of the present design.
Figure 10:
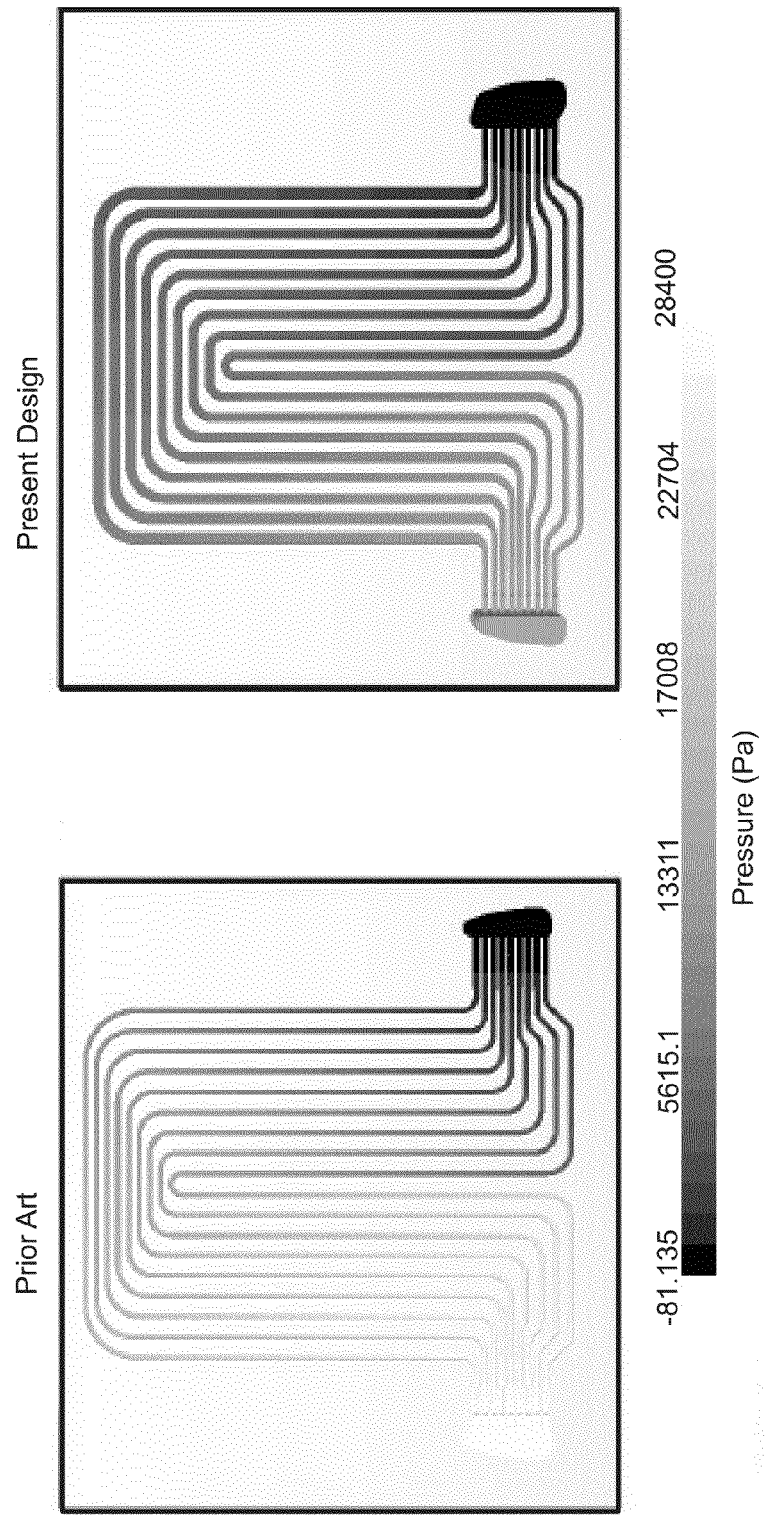
FIG. 10 provides a calculated pressure profile for a prior art cooling fin and for a cooling fin of the present design.

MC9 in the present design. FIG. 8B provides plots of the heat removal for each case. In the present design more heat is removed by channels MC1-MC3. FIG. 9 provides a calculated temperature profile for a prior art cooling fin and for a cooling fin of the present design. It is readily apparent that the temperature profile is more uniform for the present design. FIG. 10 provides a calculated pressure profile for a prior art cooling fin and for a cooling fin of the present design. In particular, the temperature variation of the prior art design is 5.3° C. with an average battery temperature of 33.69° C. The temperature variation of the prior art design is 4.5° C. with an average battery temperature of 33.0° C. It is readily apparent that the present design also provides a lower pressure drop. In particular, the prior art pressure drop is 28.4 kPa while that of the present design is 12.4 kPa.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A micro-channel cooling fin for a battery module, the micro-channel cooling fin comprising a metal plate assembly defining a plurality of cooling channels therein, the metal plate assembly including:
   an inlet section for introducing a liquid coolant into the plurality of cooling channels; and
   an outlet section from which the coolant exits the plurality of cooling channels, a first subset of cooling channels providing a first mass flow rate of the coolant to a first fin region of the metal plate assembly and a second subset of the cooling channels providing a second mass flow rate of the coolant to a second fin region of the metal plate assembly, the metal plate assembly positionable between battery cells in a battery module such that the first fin region is proximate to a first battery region and the second fin region is proximate to a second battery region where the first battery region has higher temperature during battery operation than the second battery region when the battery module is not cooled.

2. The cooling fin of claim 1 wherein each channel of the first subset provides a higher mass flow rate than each channel of the second subset when the coolant is flowed through the plurality of cooling channels.

3. The cooling fin of claim 2 wherein the first subset of cooling channels is closer to an anode tab and cathode tab of the battery cell.

4. The cooling fin of claim 1 wherein each channel of the first subset provides a lower flow resistance than each channel of the second subset.

5. The cooling fin of claim 1 wherein each channel of the first subset has a higher average cross sectional area than each channel of the second subset.

6. The cooling fin of claim 1 wherein the channels of the first subset have a smaller average separation than the channel of the second subset.

7. The cooling fin of claim 1 wherein the metal plate assembly has a first end and a second end, a first side and a second side such that the inlet section is positioned at the first end and the first side and the outlet section is positioned at the first end and the second side.

8. The cooling fin of claim 7 wherein each cooling channel has a first channel region with a first cross sectional area from 0.5 to about 0.8 mm$^2$ and a second channel region with a second cross sectional area from 0.5 to about 0.8 mm$^2$, the second channel region being in fluid communication with the first channel region which is in fluid communication with the inlet section.

9. The cooling fin of claim 8 wherein each cooling channel includes a U-shaped channel section that is in fluid communication with the second channel region.

10. The cooling fin of claim 9 wherein the U-shaped channel section has a third cross sectional area from about 1.0 to about 1.8 mm$^2$.

11. The cooling fin of claim 10 wherein the first channel region has a trapezoidal cross section.

12. The cooling fin of claim 10 wherein the second channel region and the U-shaped channel section each independently have a hexagonal cross section.

13. The cooling fin of claim 1 wherein the liquid coolant for each channel having an outlet temperature and an inlet temperature such that the outlet temperature minus the inlet temperature for all the micro channels is within 5° C.

14. A micro-channel cooling fin for a battery module, the micro-channel cooling fin comprising a metal plate assembly defining a plurality of cooling channels therein, the metal plate assembly including:
   an inlet section for introducing a liquid coolant into the plurality of cooling channels; and
   an outlet section from which the coolant exits the plurality of cooling channels, the liquid coolant for each channel having an output temperature and an input temperature such that the output temperature minus the input temperature for all the micro channels is within 5° C.

15. A battery module comprising
   a plurality of battery cells;
   a plurality of cooling fins interposed between battery cells in the plurality of battery cells; and
   a liquid coolant system for circulating liquid coolant through the cooling fins;
   wherein each cooling fin comprises a metal plate assembly defining a plurality of cooling channels therein, the metal plate assembly including:
      an inlet section that receives the coolant from the liquid coolant system and directs the coolant into the plurality of cooling channels; and
      an outlet section from which the coolant exits the plurality of cooling channels, a first subset of the cooling channels providing a first mass flow rate of the coolant to a first fin region of the metal plate assembly and a second subset of the cooling channels providing a second mass flow rate of the coolant to a second fin region of the metal plate assembly, the metal plate assembly positionable adjacent to a battery cell such that the first fin region is proximate to a first battery region and the second fin region is proximate to a second battery region where the first battery region has higher temperature during battery operation than the second battery region when the battery module is not cooled.

* * * * *